(12) United States Patent
Wiemokly et al.

(10) Patent No.: US 12,313,534 B2
(45) Date of Patent: May 27, 2025

(54) MULTI-SPECTRAL METHODS AND SYSTEMS FOR DAY AND NIGHT SENSING OF GREENHOUSE GAS SOURCES FROM SPACE

(71) Applicant: BAE Systems Space & Mission Systems Inc., Broomfield, CO (US)

(72) Inventors: Gary D. Wiemokly, Erie, CO (US); Timothy J. Commons, Louisville, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 316 days.

(21) Appl. No.: 18/121,152

(22) Filed: Mar. 14, 2023

(65) Prior Publication Data

US 2024/0272069 A1 Aug. 15, 2024

Related U.S. Application Data

(60) Provisional application No. 63/445,160, filed on Feb. 13, 2023.

(51) Int. Cl.
*G01N 21/3504* (2014.01)
*F25B 9/14* (2006.01)
(Continued)

(52) U.S. Cl.
CPC ........... *G01N 21/3504* (2013.01); *F25B 9/14* (2013.01); *G02B 5/201* (2013.01); *G02B 5/202* (2013.01);
(Continued)

(58) Field of Classification Search
CPC .. G01N 21/3504; H04N 25/20; H04N 25/768; F25B 9/14; G02B 5/201; G02B 5/202; G02B 5/208; G02B 5/26
See application file for complete search history.

(56) References Cited

U.S. PATENT DOCUMENTS 10,295,410 B2   5/2019   Nowicki et al.
10,444,145 B2   10/2019  Maschhoff et al.
(Continued)

OTHER PUBLICATIONS

Official Action for U.S. Appl. No. 18/203,803, dated Sep. 11, 2023 8 pages.
(Continued)

*Primary Examiner* — David P Porta
*Assistant Examiner* — Fani Polyzos Boosalis
(74) *Attorney, Agent, or Firm* — Sheridan Ross P.C.

(57) ABSTRACT

Multi-spectral methods and systems for the day and night remote sensing (detection, identification, and quantification) of greenhouse gas emission sources from space are provided. The sensor system includes a telescope assembly that passively collects light from an observation area and directs that light through spectral, optical filters and to a sensor array having a plurality of rows and columns of pixels. Different groups of sensor array pixel rows are aligned to receive light that has passed through different optical filters. The filters have passbands corresponding to the reflective and emissive bands of gases of interest, as well as associated reflective and emissive reference bands, and broadband spectral bands. A set of image data frames is obtained as the field of view of the sensor system moves over an observation area and an aggregate image showing locations of detected gas emissions is generated using the collected data.

20 Claims, 11 Drawing Sheets

(51) Int. Cl.
  *G02B 5/20* (2006.01)
  *H04N 25/20* (2023.01)
  *H04N 25/768* (2023.01)
  *G02B 5/26* (2006.01)

(52) U.S. Cl.
  CPC ............. *G02B 5/208* (2013.01); *H04N 25/20* (2023.01); *H04N 25/768* (2023.01); *G02B 5/26* (2013.01)

(56) References Cited

U.S. PATENT DOCUMENTS

| | | |
|---|---|---|
| 11,143,572 B2 | 10/2021 | Waxman et al. |
| 2003/0193589 A1 | 10/2003 | Lareau et al. |
| 2018/0106673 A1 | 4/2018 | Pagano et al. |
| 2019/0195725 A1* | 6/2019 | Waxman ............ G01N 33/0036 |
| 2020/0128196 A1 | 4/2020 | Kester |
| 2020/0232963 A1 | 7/2020 | Zelinski |
| 2022/0341907 A1 | 10/2022 | Gutierrez |
| 2023/0119608 A1 | 4/2023 | Gains et al. |

OTHER PUBLICATIONS

Notice of Allowance for U.S. Appl. No. 18/203,803, dated Oct. 4, 2023 11 pages.

Romaniello et al. "A Sensitivity Study of the 4.8 μm Carbon Dioxide Absorption Band in the MWIR Spectral Range," Remote Sensing, 2020, vol. 12, No. 1, article 172, 12 pages.

Scafutto et al. "Detection of Methane Plumes Using Airborne Midwave Infrared (3-5 μm) Hyperspectral Data," Remote Sensing, 2018, vol. 10, No. 8, article 1237, 16 pages.

Notice of Allowance for U.S. Appl. No. 18/203,803, dated Dec. 12, 2023 8 pages.

Extended Search Report for European Patent Application No. 23177121.3, dated Oct. 16, 2023 12 pages.

Goldberg et al. "Calibration of the Compact Mid-wave Imaging System (CMIS), a Candidate for Low-cost, Low SWaP Instrument for Weather Satellites," SPIE Proceedings, Sensors and Systems for Space Applications XIII, 2020, vol. 11422, article 1142204, 20 pages.

Qian "Hyperspectral Satellites, Evolution, and Development History," IEEE Journal of Selected Topics in Applied Earth Observations and Remote Sensing, 2021, vol. 14, pp. 7032-7056.

International Seach Report and Written Opinion for International (PCT) Patent Application No. PCT/US2023/064286, dated Oct. 16, 2023 15 pages.

* cited by examiner

MULTI-SPECTRAL METHODS AND SYSTEMS FOR DAY AND NIGHT SENSING OF GREENHOUSE GAS SOURCES FROM SPACE

CROSS-REFERENCE TO RELATED APPLICATION

This application claims the benefit of U.S. Provisional Patent Application Ser. No. 63/445,160, filed Feb. 13, 2023, the entire disclosure of which is hereby incorporated herein by reference.

FIELD

A Multi-Spectral Method and System for the day and night sensing (detection, identification, and quantification) of greenhouse gas sources from space are provided.

BACKGROUND

Initiatives addressing climate change, as exemplified by the Paris Agreement, have increased interest in the ability to remotely sense (detect, identify, and quantify) global greenhouse gas sources. Systems for remotely sensing such sources include satellite and airborne remote sensing of $CO_2$ and $CH_4$ using spectrometer-based instruments. Spectrometer-based systems can effectively measure small spatial and temporal changes in an imaged atmosphere volume's gas composition. However, such designs are relatively complex instruments with poor throughput that require a large ground sampling distance (GSD) per pixel, large telescope apertures, and/or unique satellite collecting maneuvers (such as satellite back scan, or complex optical elements, such as payload scanning mirrors), to increase dwell longer than the ground velocity of the satellite and thereby improve the signal to noise ratio of the instrument. This added time limits the number of targets a space-based instrument can collect per orbit.

In a spectrometer-based system, the column of atmosphere over each GSD is measured across a highly resolved spectral band. The data is then processed to remove the impact of ground spectra, sun angle, and thermal characteristics using complicated algorithms, leaving the spectral characteristics of the source. Discrimination of the source quantity from the atmosphere is typically done by either mathematically comparing data collected from the GSD measuring the source's emission to a neighboring GSD measuring a non-emission signature, or by fitting the collected spectra of many GSDs within the image to a spectral radiance model of the remote sensing configuration in order to remove the effects from ground, sun, and temperature. Although the high resolution spectral information provides the capability to discriminate background or other gases, a spectrometer-based instrument adds processing and collection complexity to extract the source and meet a high signal to noise ratio.

Spectrometer-based instruments in space typically select measurement bands in the short wave infrared (SWIR), which requires solar (daylight) illumination to measure the source. An alternative would be to select a measurement band in the mid-wave infrared (MWIR), where the source molecules have strong characteristic thermal emission spectra. However, operating a spectrometer-based instrument in the MWIR requires cooling both the instrument and the focal plane array to cryogenic temperatures using cryocoolers to minimize noise and the instrument's thermal background (self-emission) of the instrument. This added complication has limited the typical spectrometer-based instruments in space to SWIR, daytime operation, which not only reduces the instrument's sensitivity, but limits collection to one-half the orbit (daytime).

The increased demand for remote measurements of global greenhouse gas sources requires a system to collect data concerning a large number of known or potential emission sites across the entire globe and provide key information within hours for a fast, proactive mitigation process. The large number of sites all over the globe requires multiple space-borne systems that can collect information at maximum rate and then transmit, process, and disseminate key reports to clients within hours of measurement. Because spectrometers split the measured radiance from the scene into small spectral bands, the collection time to raise signatures above the noise background either requires long integration, large telescopes, complex scanning mechanisms, or large GSDs (which do not allow precise location and discrimination of sources). In addition a spectrometer-based solution has large data sets due to the number of spectral bands provided, which increases downlink, processing and dissemination time.

To meet tomorrow's high demand for global greenhouse gas source reporting, a unique method of remote sensing has to be developed to (a) provide a minimum set of required spectral information to sense the source; (b) enable a low cost space-based system that collects large areas at the maximum rates possible; and (c) provide both SWIR (daytime) and MWIR (nighttime) collection to take advantage of higher MWIR sensitivity as well as double the collects per orbit.

SUMMARY

Multi-spectral methods and systems for day and night sensing of emissions from gas sources, including but not limited to emissions of greenhouse gas (GHG), from space are provided. A GHG sensor system as disclosed herein can include a spaceborne satellite to manage the mission; a payload consisting of a telescope, multi-spectral imaging (MSI) sensor, cooling system, and associated electronics; and ground-based communications, control and data processing. In particular, a GHG sensor system in accordance with embodiments of the present disclosure incorporates an MSI sensor having relatively broad optical filters that encompass wavelengths corresponding to the absorptive (reflective, SWIR) and emissive (radiated, MWIR) bands of GHGs of interest (known as on-band spectral filters), as well as one or more filters that encompass wavelengths near but not within those absorptive or emissive bands (known as off-band spectral filters). The optical spectral filters are manufactured to have an optical bandpass that selects imaged, incoming radiance on- or off-band to be measured by preselected rows of an associated sensor array. The sensor array, also referred to herein as a focal plane array or detector array, can be cooled by a cryocooler, enabling simultaneous operation over SWIR and MWIR wavelengths.

In accordance with embodiments of the present disclosure, the different on-band and off-band wavelengths (in either SWIR (reflective) or MWIR (emissive) bands) encompassed by the spectral filters with their associated detectors, measure signals within each GSD of an image of the GHG emissions and the neighboring area. In addition, broadband filters (in either SWIR (reflective) or MWIR (emissive) bands) can be included to provide context information that can be used to geolocate detected GHG emissions to ground features or objects (e.g., factory pipes, stacks, or valleys, etc.), without requiring post processing. Each spectral filter is disposed to image an area on the ground with the same spectral band to a selected number of rows on the focal plane array. The selected focal plane rows of the same spectral band are then scanned over the collected area encompassing the source of interest. Through this scanning motion all focal plane rows with the same spectral band pass over the same line of ground and can be added to improve the signal to noise ratio. As the multispectral imager is scanned over the area containing the source of interest, multiple images with different spectral bands comprised of on band and off band (reflective (SWIR) and/or emissive (MWIR)) images are formed. The exact number of focal plane rows within a spectral filter is designated to meet a required signal to noise to detect a given GHG while setting each GSD's integration time to meet the ground velocity of the satellite system. This process is typically called the Time Domain Integration (TDI) method. The quantity and position of the different spectral filters are selected based on mission objectives and the performance of optical elements used to collect the radiated and emitted light. The various spectral filters are directly connected to the focal plane array to minimize sensor complexity and ensure calibrated alignment registration over the life of the mission.

The wavelengths encompassed by the on- and off-band filters can be relatively large, particularly as compared to the narrow spectral bands identified by the spectrometer-based systems, while still enveloping the absorption or emission band. This, along with the above TDI method, eliminates the need to incorporate spectrometer-based sensor complexities that were required to improve signal to noise. The resulting multi-spectral imager architecture is less complex than the spectrometer-based systems, and enables the integration of MWIR focal planes and their associated cryocoolers, while meeting required performance for the sensing of GHGs from space.

The operation of systems in accordance with embodiments of the present disclosure can be controlled through the execution of stored instructions or software by an on-board processor, autonomously or in connection with instructions or commands received from other systems or control nodes. In addition to implementing flexible TDI techniques, the execution of the instructions can include the application of artificial intelligence techniques to identifying the content and source locations of GHGs.

Additional features and advantages of embodiments of the disclosed systems and methods will become more readily apparent from the following description, particularly when taken together with the accompanying drawings.

BRIEF DESCRIPTION OF THE DRAWINGS

FIGS. 7A and 7B depict further aspects of a process for collecting imaging data and sensing emissions in accordance with embodiments of the present disclosure;

DETAILED DESCRIPTION

Figure 1:
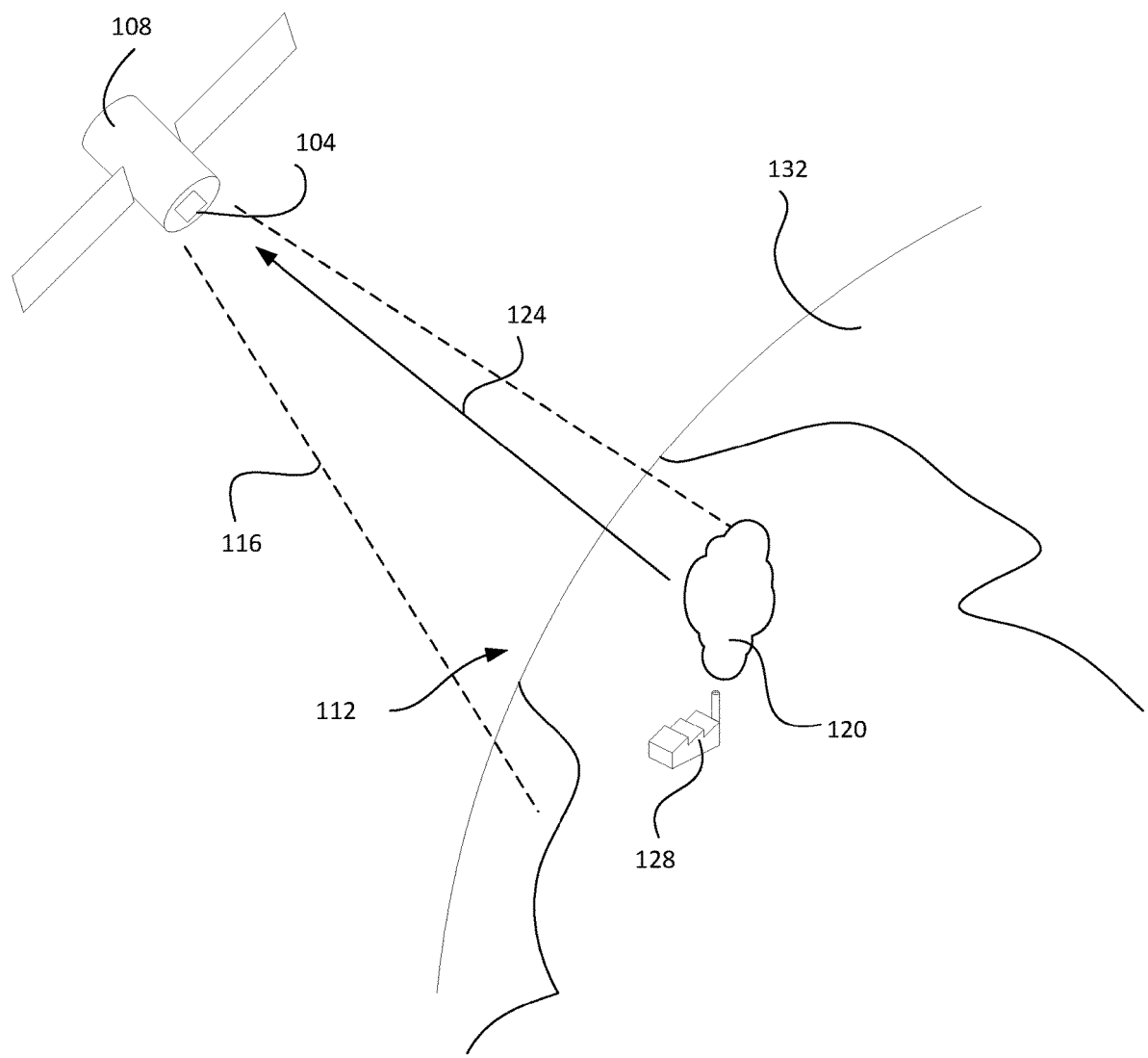
FIG. 1 depicts an arrangement for sensing greenhouse gas emissions in accordance with embodiments of the present disclosure.

FIG. 1 depicts a sensor system 104 in accordance with embodiments of the present disclosure deployed on a platform 108 and operating to sense emissions 120 from within an observation area 112. More particularly, the sensor system 104 is a remote sensor system incorporating an optical assembly capable of remotely sensing emissions 120 of a gas of interest, where sensing emissions 120 can include one or more of detecting, identifying, and quantifying one or more gases of interest included in the emissions 120, by passively collecting image data from an observation area 112 within a field of view 116 of the sensor system 104. As an example, the sensor system 104 can be operated to remotely sense selected gases included in intentional or unintentional (fugitive) emissions 120 in day and night conditions. In various exemplary embodiments discussed herein, the sensor system 104 is configured to sense emissions 120 of or including selected greenhouse gasses (GHGs). In general, the sensor system 104 operates by passively sensing light 124 received from within the field of view 116 at wavelengths encompassing the absorptive (reflective) and emissive (radiated) bands of the gas or gasses of interest, and at least one reference band. Moreover, for a detected gas, the sensor system 104 is capable of providing information regarding the quantity and rate of emissions 120. Where the sensor system 104 is configured to sense multiple gases, such gases are separately recognized. In addition, in at least some embodiments, the sensor system 104 is configured to provide context information to assist in identifying a geographic location and identity of the source 128 of the sensed emissions 120. In still further embodiments, the sensor system 104 can be configured to sense gases other than GHGs, in addition or as an alternative to sensing GHGs.

As depicted in FIG. 1, in an example operating scenario, the sensor system 104 is carried by a platform 108 in the form of a satellite in an orbit about the Earth 132 (such as a low Earth orbit (LEO)) in which the location of the platform 108 relative to the surface of the Earth 132 is continually changing. As a result, the field of view 116 of the sensor system 104 will encompass a continually changing observation area 112. This enables the sensor system 104 to monitor different areas of the surface of the Earth 132 for GHG emissions. In order to ensure full and timely coverage of areas of interest, a constellation of satellites, each carrying a sensor system 104 can be deployed. Embodiments of the present disclosure provide resolution sufficient to identify the specific emissions sources 128. Moreover, at least some embodiments of the present disclosure facilitate the geolocation of emissions sources 128 by providing context information in the form of broadband image information. Although there are various advantages to carrying the sensor system 104 on a satellite, a sensor system 104 as disclosed herein is not limited to use with any particular type of platform 108. Instead, a sensor system 104 can be carried by or mounted to any platform 108 capable of positioning the sensor system 104 such that the field of view 116 encompasses a desired observation area 112. As examples, a sensor system 104 can be carried by a balloon, aircraft, spacecraft, unmanned aerial vehicle, automobile, ship, or other mobile platform. As further examples, a sensor system 104 can be mounted to a building, tower, or tripod. As yet another example, a sensor system 104 can be hand carried.

Figure 2A:
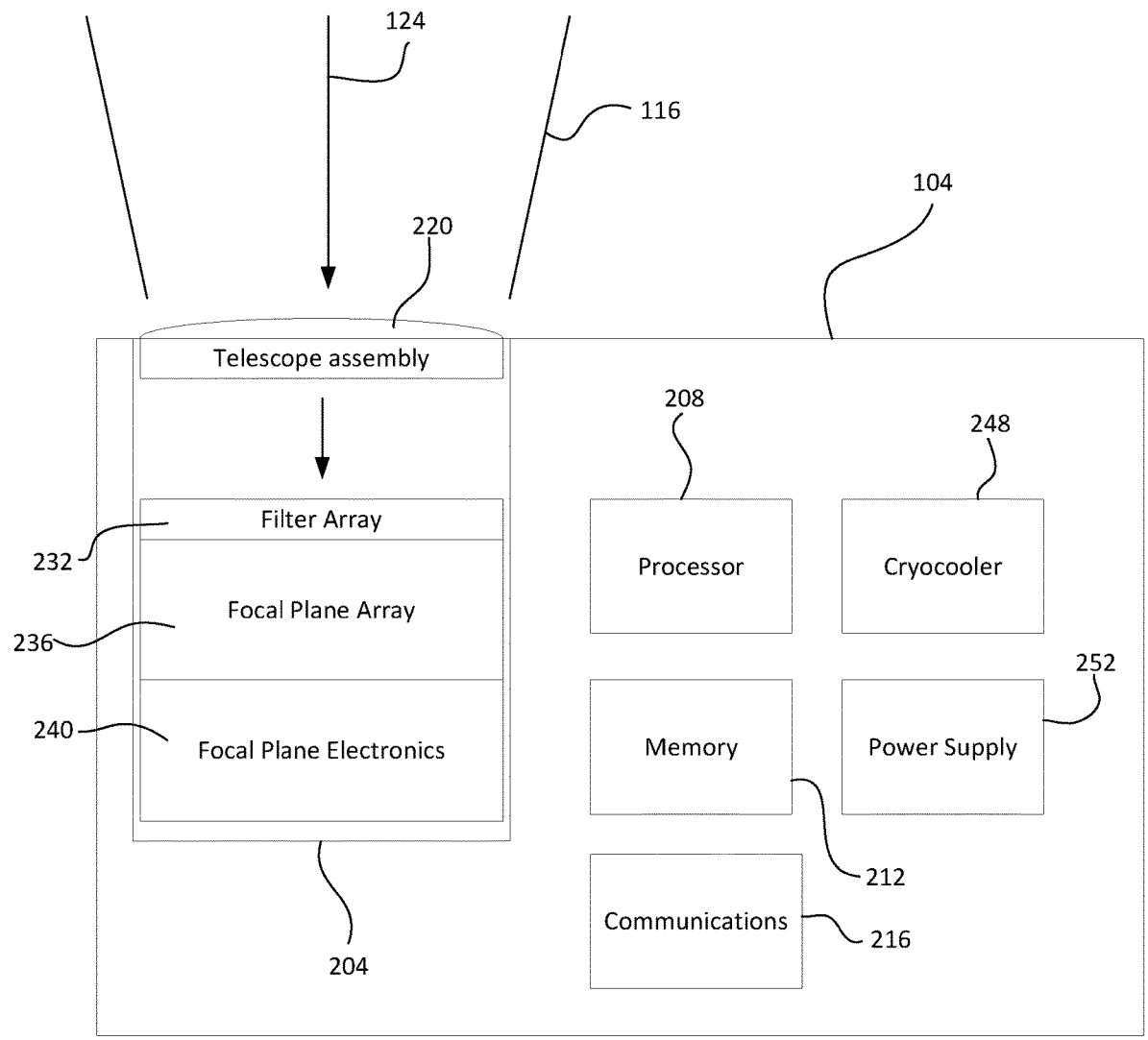
FIGS. 2A and 2B are block diagrams depicting components of sensor systems in accordance with embodiments of the present disclosure.

FIG. 2A is a block diagram depicting elements of a sensor system 104 in accordance with at least some embodiments of the present disclosure. In general, the sensor system 104 includes a sensor assembly or camera 204, a processor 208, memory and/or data storage 212, and a communications interface 216. The sensor assembly 204 generally includes a telescope assembly 220, a filter array 232, a detector or sensor array 236 (also referred to herein as a focal plane array or image sensor), and focal plane electronics 240. In some embodiments, the detector or sensor array 236 may comprise an image sensor. In addition, the sensor system 104 can include a cryocooler 248 and a power supply 252.

The sensor system 104 processor 208 can include one or more general purpose programmable processors, graphics processing units (GPUs), vector processors, array processors, field programmable gate arrays (FPGA), controllers, or other processing device or set of devices capable of executing instructions for operation of the sensor system 104, including operation and control of the sensor assembly 204 and the time domain integration (TDI) of collected information as described herein. The instructions executed by the processor 208 can be stored as application programming in the memory and/or data storage 212. The memory and/or data storage 212 can include one or more volatile or non-volatile solid-state memory devices, such as but not limited to RAM, SDRAM, one or more mass storage devices, such as, but not limited to, a hard disk drive, an optical storage device, a solid-state drive, or the like. In addition to providing storage for the application programming, the memory and/or the data storage 212 can store intermediate or final data products, such as frames of image data and aggregate images, or other data or reference information. The memory and/or the data storage 212 can also store location and location reference information in the form of an object catalog database, navigational information, and image data. In addition, the memory and/or data storage 212 can store detector performance parameter data.

The sensor assembly 204 can be provided as a camera having a lens assembly or telescope assembly 220 that collects light from within the field of view 116 of the sensor system 104 onto the sensor array 236. The telescope assembly 220 can include refractive, reflective, or both refractive and reflective elements. The collected light is passed to the sensor array 236, which can be operated with a defined frame rate and exposure time. In general, the integration time and frame rate are operated such that the exposure times of individual frames of image data are sufficiently short to avoid the smearing of point light sources across the sensor array 236. The sensor array 236 generally includes several photosensitive sites or pixels. For embodiments in which the sensor assembly 204 is configured as a scanning array, the sensor array 236 can have as few as one row and multiple columns of pixels. For embodiments in which the sensor assembly 204 is configured as a staring array, or in some scanning array configurations, the sensor array 236 has multiple rows and multiple columns of pixels. The rows of pixels are typically disposed in a cross-track direction (i.e. each row is perpendicular to the direction of travel of the field of view 116 relative to the observation area 112). In accordance with at least some embodiments of the present disclosure, the sensor array 236 is sensitive to a range of wavelengths extending from about 1 µm to about 5 µm. As an example, but without limitation, the sensor array 236 can include a CMOS or infrared image sensor that is sensitive to light across a range of wavelengths that include at least the range of wavelengths passed by the spectral filters of an associated filter array 232. Moreover, the sensor array 236 can include a relatively large number of pixels. As examples, the sensor array 236 can feature a 1024×1024 array of pixels, a 3072×2048 array of pixels, or a 4096×4096 array of pixels. The various components of the sensor assembly 204 can be interconnected by or disposed within a housing.

A sensor assembly 204 in accordance with embodiments of the present disclosure includes a filter array 232 that is disposed directly on a light incident surface side of the sensor array 236. For example, the filter array 232 can be adhered, mechanically attached, or otherwise fixed to or integrated with the sensor array 236. As discussed in greater detail elsewhere herein, the filter array 232 provides a number of enveloping spectral filters, selected in view of on-band and off-band wavelengths of gases of interest, thereby enabling the sensor assembly 204 to perform MSI. In addition, a filter array 232 in accordance with embodiments of the present disclosure can simultaneously include broadband filters to facilitate the collection of context data.

The communications interface 216 can include, as examples and without limitation, communications transmitters and receivers utilizing radio frequency or light based signaling methodologies. The communications interface 216 can operate to transmit data collected by the sensor assembly 204 to ground stations or to communications interfaces on other platforms. The communications interface 216 can also operate to receive operational instructions or updates in connection with the operation of the sensor system 104.

Figure 2B:
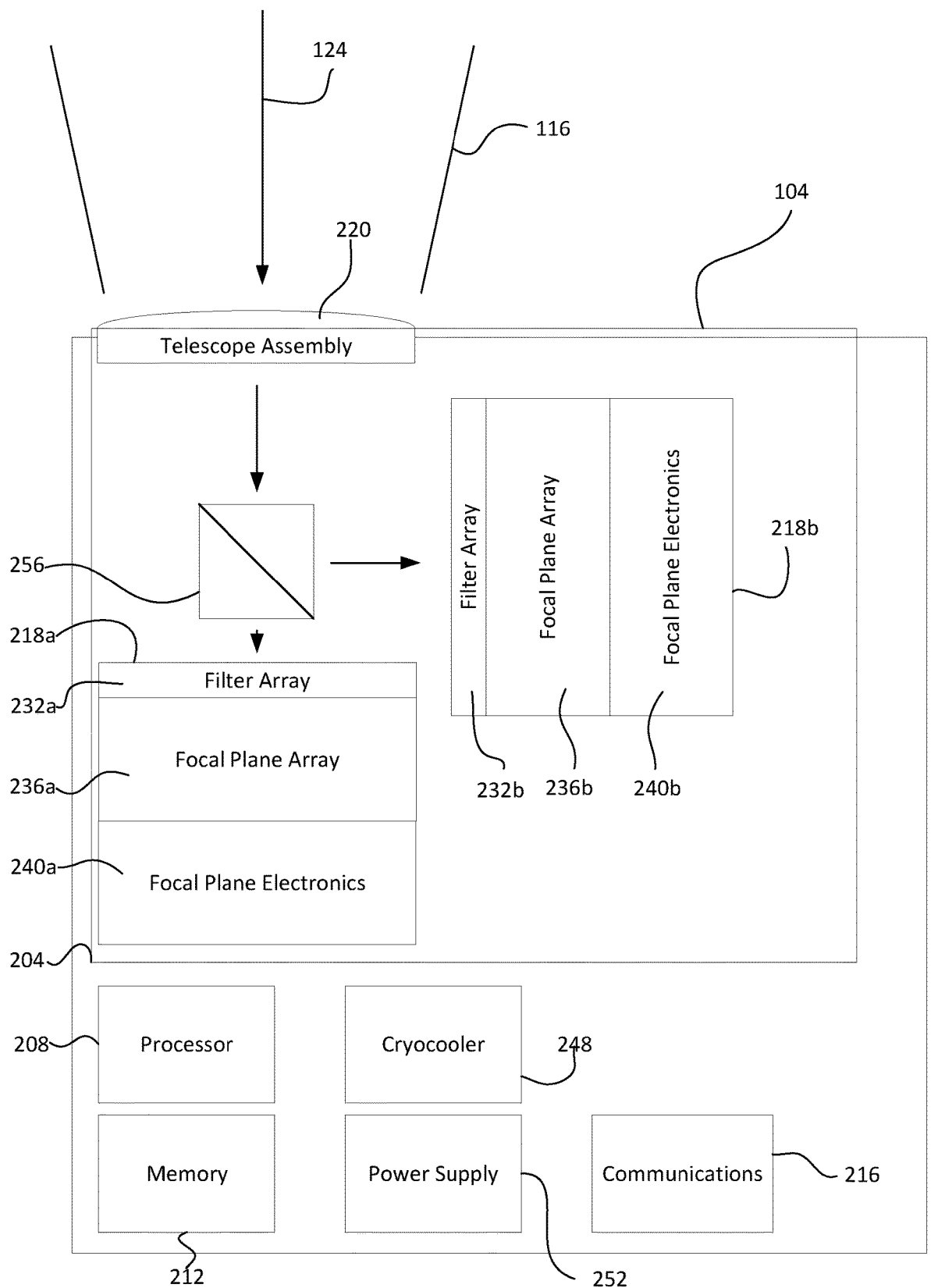

FIG. 2B depicts a sensor system 104 in accordance with further embodiments of the present disclosure that differs from the sensor system 104 depicted in FIG. 2A in that the sensor assembly 204 includes multiple filter array 232, sensor array 236, and focal plane electronics 240 assemblies 218. More particularly, a first assembly 218a, including a first filter array 232a, a first sensor array 236a, and first focal plane electronics 240a, is provided for operation in SWIR (shortwave infrared) wavelengths, while a second assembly 218b, including a second filter array 232b, a second sensor array 236b, and second focal plane electronics 240b, is provided for operation in MWIR (mid-wave infrared) wavelengths. In addition, such embodiments include a beam splitter 256 or other optical arrangement to provide the light collected by the single telescope 220 to the different assemblies 218.

Figure 3:
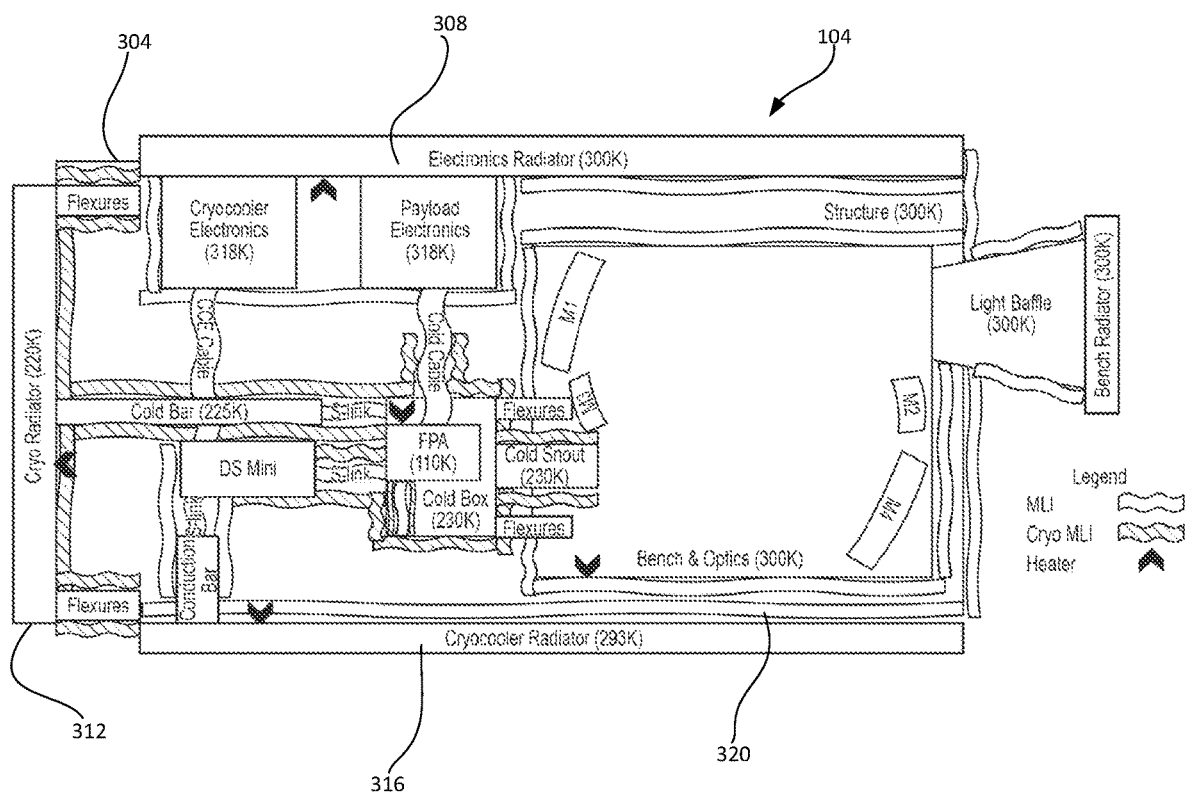
FIG. 3 depicts a sensor system configuration in accordance with embodiments of the present disclosure.

FIG. 3 depicts a sensor system 104 configuration in accordance with exemplary embodiments of the present disclosure. The components of the sensor system 104 can be mechanically interconnected through a support structure 304. Portions of the exterior surfaces of the support structure 304 can be formed or covered by various radiators, such as an electronics radiator 308, a first cryocooler radiator 312, and a second cryocooler radiator 316. Various cold bars and cables can be included for removing heat from selected components including but not limited to the sensor array 236. In addition, multilayer insulation 320 can be provided as insulation between different sensor system 104 components, and between the sensor system 104 and the external environment.

Figure 4:
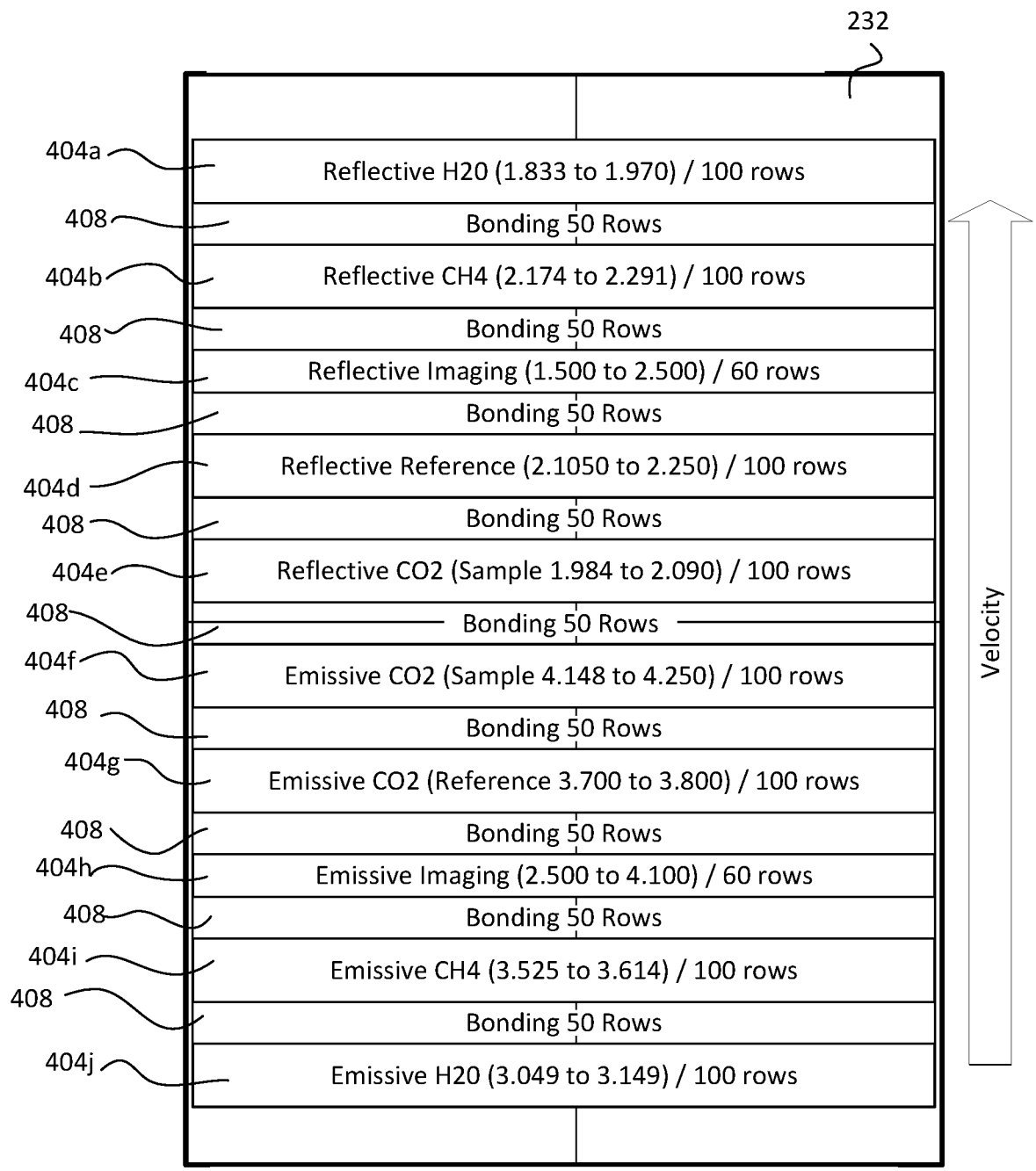
FIG. 4 depicts a spectral filter arrangement in accordance with embodiments of the present disclosure.

FIG. 4 depicts an example of a filter array 232 in accordance with embodiments of the present disclosure in a plan view. The filter array 232 includes a number of different enveloping spectral filters 404. Each spectral filter 404 passes light at wavelengths within a different filter band. In addition, the different spectral filters 404 are disposed directly adjacent the light incident surface of the sensor array 236. Accordingly, before reaching a pixel included in the sensor array 236, collected light must first pass through one of the spectral filters 404.

In the particular example illustrated in FIG. 4, each spectral filter 404 extends across the entire width of the filter array 232. Moreover, each spectral filter 404 extends across all of the columns of pixels of the sensor array 236 and over a selected number of rows of pixels of the sensor array 236. The first spectral filter 404a passes light at wavelengths of from 1.833 to 1.970 μm, and extends for 100 rows; the second spectral filter 404b passes light at wavelengths of from 2.174 to 2.291 μm, and extends for 100 rows; the third spectral filter 404c passes light at wavelengths of from 1.500 to 2.500 μm, and extends for 60 rows; the fourth spectral filter 404d passes light at wavelengths of from 2.1050 to 2.250 μm, and extends for 100 rows; the fifth spectral filter 404e passes light at wavelengths of from 1.984 to 2.090 μm, and extends for 100 rows; the sixth spectral filter 404f passes light at wavelengths of from 4.148 to 4.250 μm, and extends for 100 rows; the seventh spectral filter 404g passes light at wavelengths of from 3.700 to 3.800 μm, and extends for 100 rows; the eighth spectral filter 404h passes light at wavelengths of from 2.500 to 4.100 μm, and extends for 60 rows; the ninth spectral filter 404i passes light at wavelengths of from 3.525 to 3.614 μm, and extends for 100 rows; and the tenth spectral filter 404j passes light at wavelengths of from 3.049 to 3.149 μm, and extends for 100 rows. As can be appreciated by one of skill in the art after consideration of the present disclosure, the first through fifth spectral filters 404a-404e generally fall within the SWIR range of wavelengths, while the sixth through tenth spectral filters 404f-404j generally fall within the MWIR range of wavelengths. In such a configuration, the filter array 232 is suitable for use in connection with a sensor system 104 having a sensor assembly 204 with a single sensor array 236, for instance as illustrated in FIG. 2A. For use in connection with a sensor system 104 having a sensor assembly 204 with a first or SWIR sensor array 236a, and a second or MWIR sensor array 236b, the filter array 232 is divided into a first filter array 232a including spectral filters 404 within the SWIR range of wavelengths that is joined to the first sensor array 236a, and a second filter array 232b including spectral filters 404 within the MWIR range of wavelengths that is joined to the second sensor array 236b.

The number of rows of pixels dedicated to different wavelength bands and the relative locations of the different filter bands across the filter array 232 can be selected in view of the performance characteristics of the associated telescope 220, and the relative importance of the different filter bands to the primary mission purpose of the sensor system 104. For instance, in the illustrated example, spectral filters 404 passing light in wavelength bands associated with the sensing of $CO_2$ are disposed across rows at or near the center of the sensor array 236, because the optical performance is highest towards the center of the sensor array 236, and because the sensing of $CO_2$ is of primary importance to the mission requirements of this example sensor system 104. In addition, in the illustrated example, the different spectral filters 404 are separated by areas of bonding 408 that each extend for 50 rows. Given different bonding or attachment techniques, a filter array 232 can have bonding areas 408 of different sizes. For instance, techniques enabling the formation of filters 404 directly onto a monolithic substrate can reduce or eliminate areas of bonding 408, thereby increasing the number of pixels available for generating signals.

Figure 5:
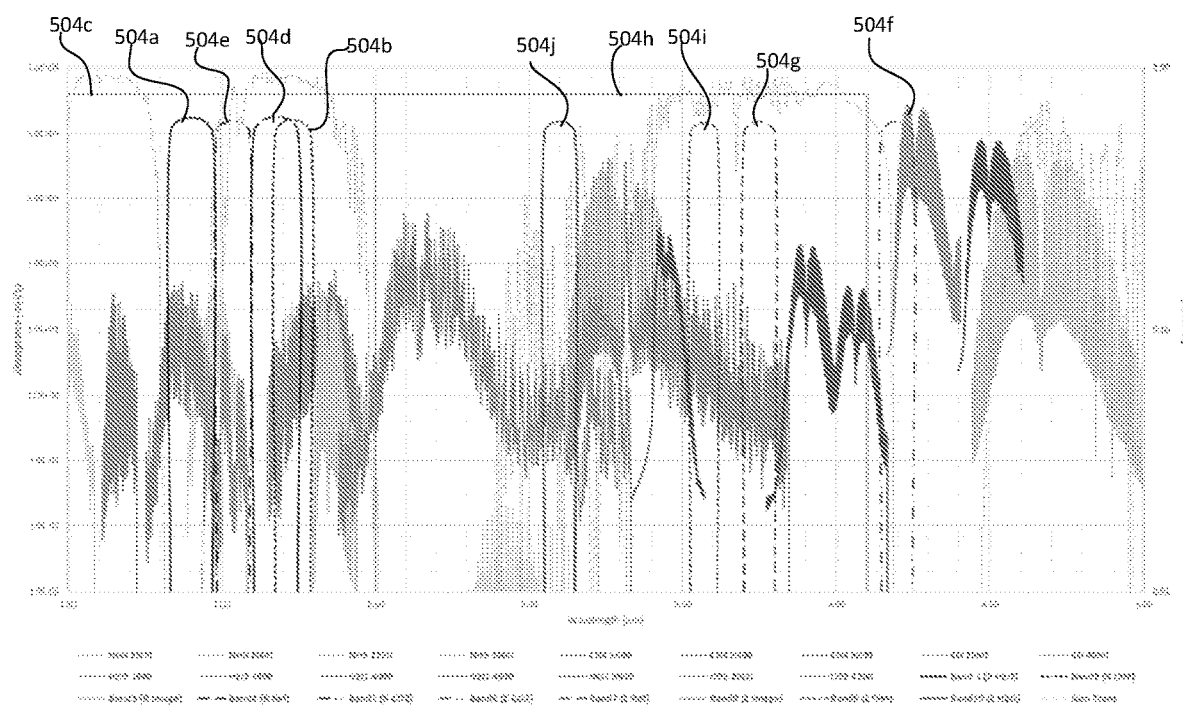
FIG. 5 depicts absorption and emission bands of example gasses in relation to passbands of a spectral filter in accordance with embodiments of the present disclosure.

FIG. 5 depicts the absorptance versus spectral wavelength of the SWIR (absorption) and MWIR (emission) bands of example atmospheric gasses in relation to passbands of a spectral filter array 232 in accordance with embodiments of the present disclosure. In general, the passbands of the spectral filters 404 are selected to encompass the absorptive (reflective) bands of gasses of interest in the SWIR wavelengths, and to encompass the emissive (radiated) bands of those gasses in the MWIR wavelengths. In addition, a spectral filter 404 with a passband that encompasses a wavelength range that is off-band with respect to at least one of the gasses of interest can be provided as a reference to facilitate the subtraction of background clutter from signals of interest. The passband of each spectral filter 404 is selected to optimize both center wavelength and spectral width (a) to maximize signal of the gas of interest; (b) minimize the impact of other gases in the atmosphere or that are found in source processes; and (c) minimize the impact of ground reflectance or emittance. In addition, all reference filter 404 center wavelengths and spectral widths are chosen to (a) minimize overlap to sampled gases, atmospheric gases, and/or gases found in source processes; (b) minimize the impact of ground reflectance or emittance; and (c) set the center wavelength as close to gas sampling bands as possible to minimize ground and atmosphere variability. The filter array 232 can also include filters 404 with relatively broad transmission bands to provide context, for example to assist in geolocating emission sources 128.

In this particular example, the gases of interest and thus the gasses that the example sensor system 104 is configured to sense include water vapor ($H_2O$), carbon dioxide ($CO_2$), and methane ($CH_4$). Alternative or additional gases can be detected by embodiments of the present disclosure through the appropriate selection and application of filters 404 having passbands selected in view of the reflective and emissive characteristics of each of the other gases. Although not a chemically active greenhouse gas, sensing water vapor can provide useful context. In this example, within the SWIR range, the passband 504a of the first spectral filter 404a is selected to encompass the reflective band of water vapor; the passband 504b of the second spectral filter 404b is selected to encompass the reflective band of methane; and the passband 504e of the fifth spectral filter 404e is selected to encompass the reflective band of carbon dioxide. Also within the SWIR range, a reflective imaging band 504c is provided by the third spectral filter 404c, and a reflective reference band 504d is provided by the fourth spectral filter 404d. Within the MWIR range, the passband 504f of the sixth spectral filter 404f is selected to encompass the emissive band of carbon dioxide; the passband 504i of the ninth spectral filter 404i is selected to encompass the emissive band of methane; and the passband 504j of the tenth spectral filter 404j is selected to encompass the emissive band of water vapor. Also within the MWIR range, an emissive reference band 504g is provided by the seventh spectral filter 404g, and an emissive imaging band 504h is provided by the eighth spectral filter 404h.

Figure 6:
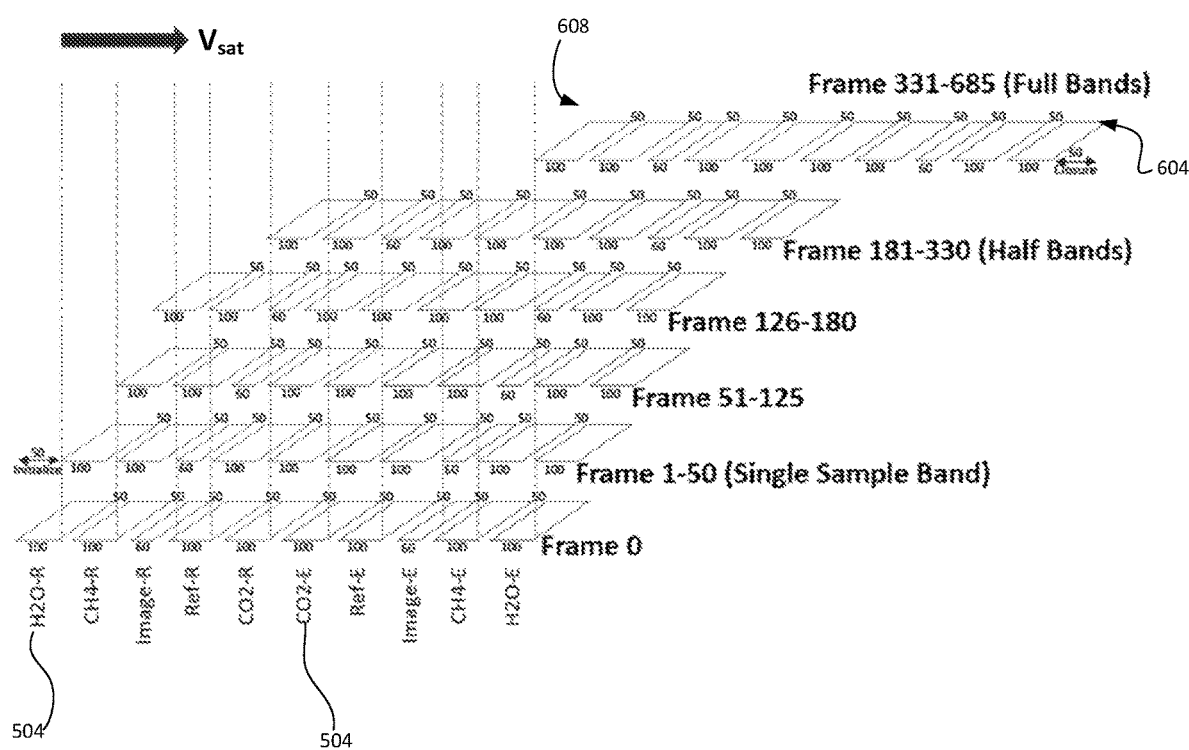
FIG. 6 depicts aspects of a process for collecting imaging data and sensing emissions in accordance with embodiments of the present disclosure.

FIG. 6 depicts aspects of a process for collecting imaging data and sensing emissions using a sensor system 104 in accordance with embodiments of the present disclosure. In this example, the sensor array 236 is operated in a staring mode, in which all of the rows of pixels are exposed to incident light during a common exposure period. As can be appreciated by one of skill in the art, although a common exposure period is used for all of the sensor array 236 pixels while collecting a single image frame, different pixels receive light from different locations within the observation space 112. Moreover, as discussed above, different sets of pixels are associated with different wavelength bands. Where the platform 108 is moving relative to the observation area 112, TDI techniques can be used to obtain full spectral information for all areas within the field of view of the sensor system 104 by aggregating data from different rows of pixels collected by a series of image frames. For instance, as depicted in FIG. 6, a new frame of data can be collected at intervals equal to the time required for a point on the ground to pass two rows of pixels in the sensor array 236. Accordingly, in this example, the number of image frames in a series or set required to provide an aggregate image with full coverage of an observation area equal in size to the area encompassed by the field of view 116 of the sensor system 104 at a particular instant in time is one-half the total number of pixel rows. In this context, it should be understood that the total number of pixel rows is made up of those pixel rows of the image sensor 236 that collect image information and thus are not obscured by bonding.

In accordance with embodiments of the present disclosure, digital TDI techniques are used to provide flexibility in determining how pixel data is aggregated to obtain a full spectrum image. For example, although the number of rows of pixels sensitive to different wavelength bands is fixed according to the physical configuration of the filter array 232 and the connected sensor array 236, digital TDI enables different numbers of rows of pixels to be used in constructing an aggregate image. Thus, as shown in FIG. 6, while the different wavelength bands 504 have a fixed number of physical rows 604 of pixels (e.g. 100 or 60), the number of rows 608 of pixels used to construct an aggregate image can be different (e.g. 50). The number of rows in any one spectral band used for constructing an aggregate image can be varied at run time based on various factors, such as environmental conditions within the observation area 112, the velocity of the sensor system 104 relative to the observation area 112, the type of gas to be sensed, or the like. Digital TDI also enables flexible aggregation of pixels in different columns, as well as in different rows.

Figure 7A:
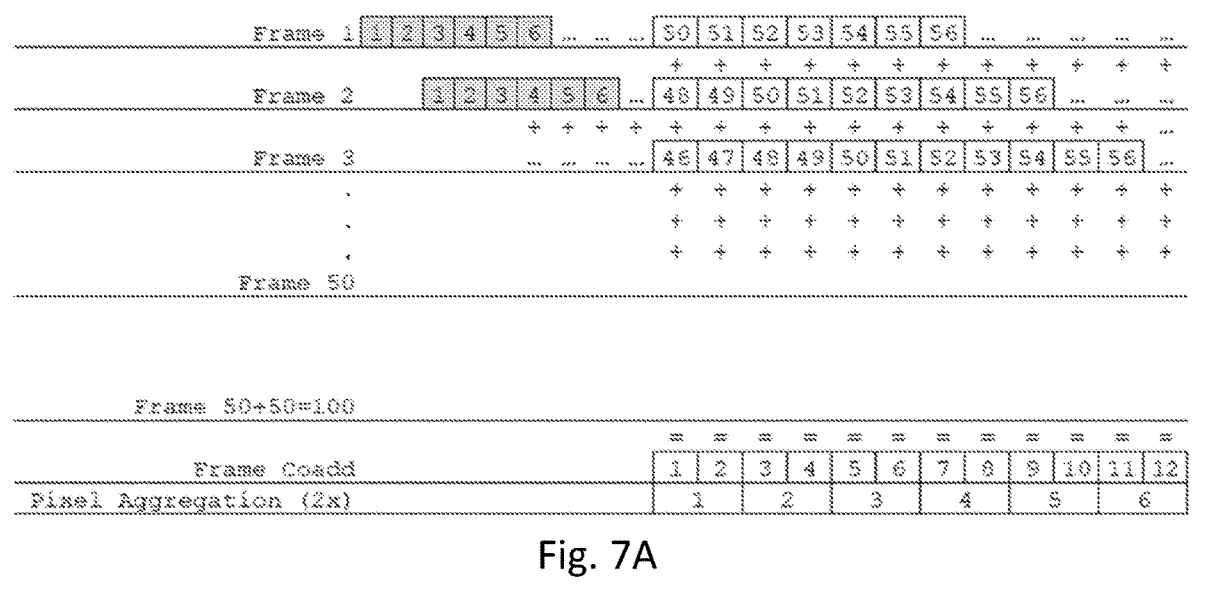
Figure 7B:
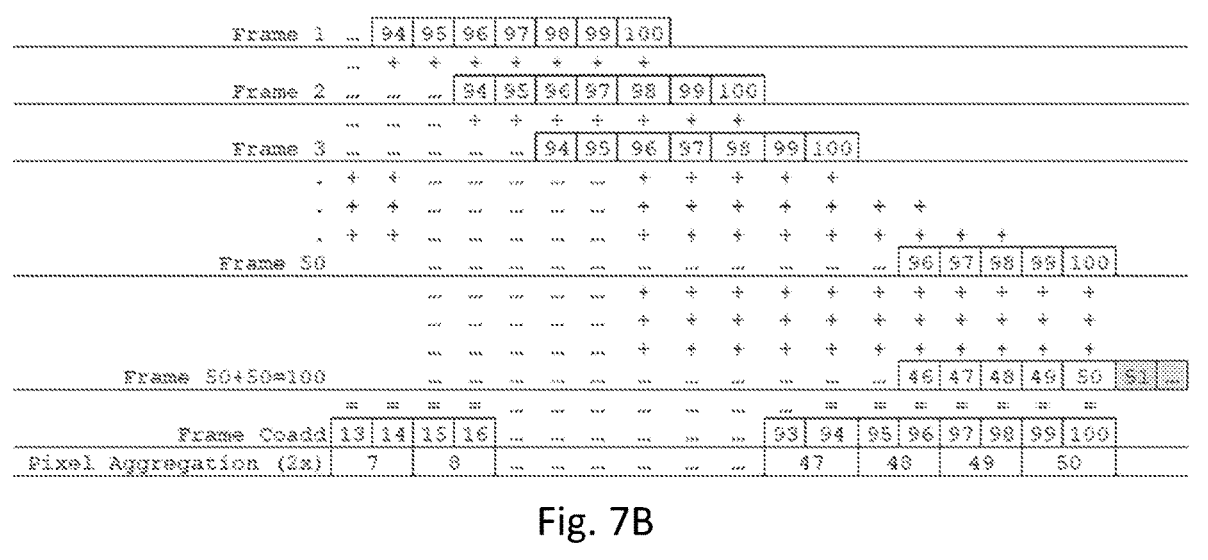

FIGS. 7A and 7B depict further aspects of a process for collecting imaging data and sensing emissions in accordance with embodiments of the present disclosure, and in particular illustrates the coaddition of pixels. The aggregation of pixels, here a 2×2 aggregation, across rows and columns, that can be implemented through TDI digital processing in accordance with embodiments of the present disclosure is also illustrated. The rows Frame 1, Frame 2, Frame 3, . . . , Frame 50, Frame 50+50=100, Frame Coadd, and Pixel Aggregation (2×) continue from FIG. 7A onto FIG. 7B.

Figure 8:
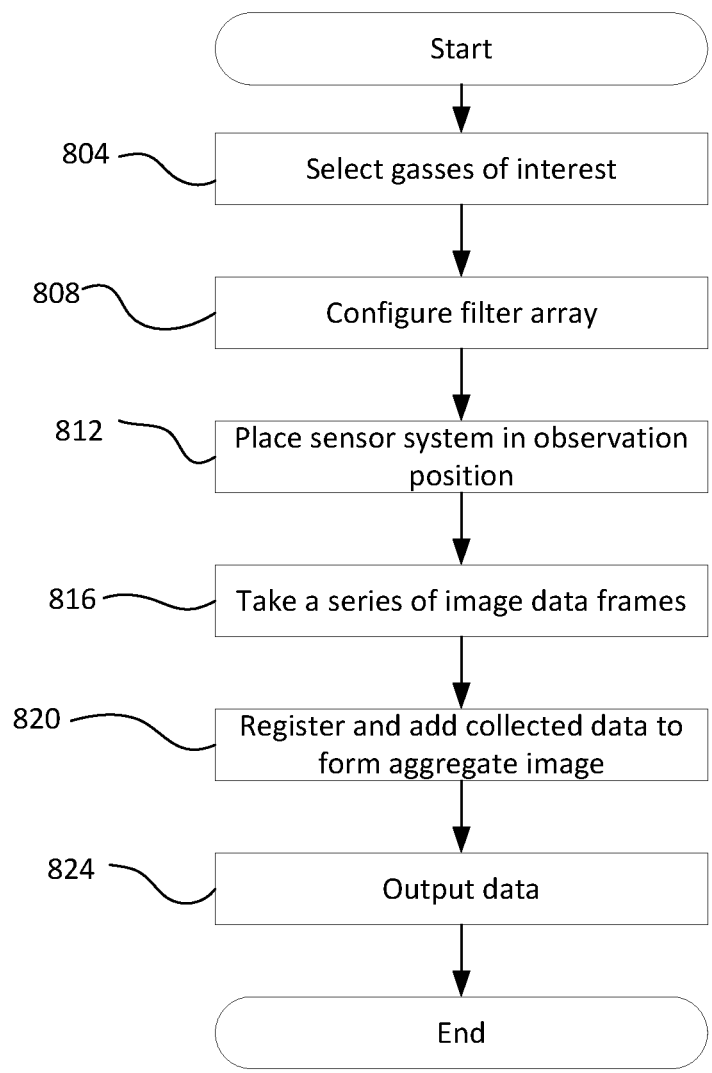
FIG. 8 is a flowchart depicting aspects of a process for sensing greenhouse gas emissions in accordance with embodiments of the present disclosure.

FIG. 8 is a flowchart depicting aspects of a process for sensing greenhouse gas emissions in accordance with embodiments of the present disclosure. Initially, one or more gasses of interest are selected (step 804). A filter array 232 is then configured (step 808). Configuring the filter array 232 can include identifying reflective and emissive bandwidths for the gasses of interest, and allocating at least some of the available area of the filter array 232, corresponding to selected rows of the sensor array 236, to spectral filters 404 having passbands corresponding to the identified bandwidths. Configuring the filter array 232 can also include allocating some of the available area to spectral filters 404 having passbands corresponding to one or more reference bands, and to one or more imaging bands. The filter array 232 can be fixed to a light incident surface side of the sensor array 236 prior to completing assembly of the sensor system 104, assuring the precise alignment and secure attachment of the filter array 232 to the sensor array 236. A sensor system 104 incorporating a sensor assembly 204 with the sensor array 236 and the associated filter array 232 can then be carried by a platform 108 into an observation position (step 812).

From the observation position, the sensor system 104 can be operated to take a series of image data frames (step 816). As the sensor system 104 is typical moving relative to the observation area, each image is different from one another. By synchronizing the rate at which images are obtained with the movement, the amount of change can be equal to one row of sensor data. Accordingly, where the filter array 232 and the sensor array 236 provide 1370 rows of pixels, and where images are desired at a maximum available resolution, as many as 1370 image frames are required to build a full, aggregate image. Where an aggregate image having less than the maximum available resolution is desired, the number of image frames required can be an amount that is less than the number of pixel rows. For example, in an embodiment in which a 2×2 pixel aggregation is performed, a full image can be constructed by adding 685 image data frames, collected over the same total time period and area as in the example where 1370 frames are collected, but at half the frame rate. In accordance still other embodiments of the present disclosure, the frame rate and/or the number of rows of pixels that are combined can be adjusted based on the velocity of the sensor system 104 field of view 116 relative to the observation area 112.

Once the required number of image data frames have been collected, the data within the image frames is registered and added to form the aggregate image (step 820). In accordance with at least some embodiments of the present disclosure, the sensor system 104 includes pixels sensitive to wavelengths of from about 1.5 μm to 4.25 μm. As can be appreciated by one of skill in the art after consideration of the present disclosure, it can be difficult or impossible to focus light across such a wide range to the same point. Accordingly, digital TDI techniques are employed by embodiments of the present disclosure in order to properly register the collected data when the aggregate image is created. In accordance with at least some embodiments of the present disclosure, the digital TDI processes used to form an aggregate image can be implemented by the focal plane electronics 240 included in the sensor assembly 204. Alternatively or in addition, the TDI processes used to form the aggregate image can be implemented by the sensor system 104 processor 208 executing instructions stored in the memory or data storage 212.

Figure 9:
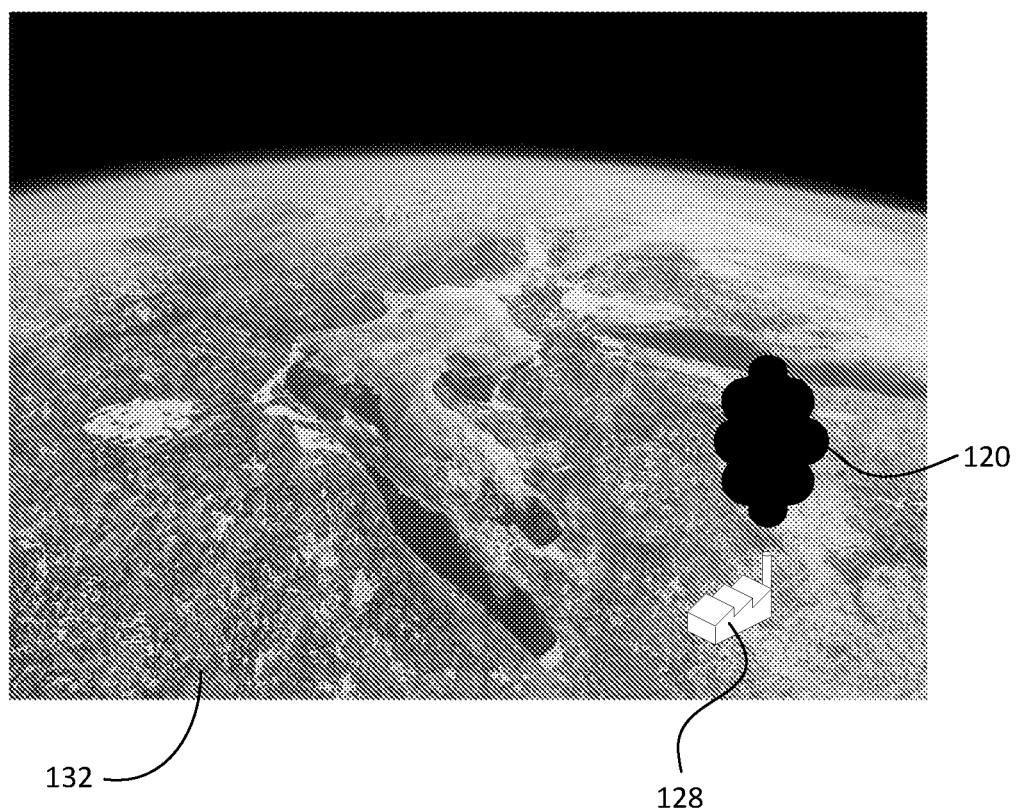
FIG. 9 is an example of an image produced by a sensor system in accordance with embodiments of the present disclosure in which greenhouse gas emissions and context information are conveyed to a user.

The aggregate image and/or aggregate image data is then output (step 824). Outputting the aggregate image can include using the communications interface 216 to transmit the aggregate image to a ground station or to another platform. The aggregate image can be in the form of a depiction of gas concentrations overlaid on an image of the scene. As can be appreciated by one of skill in the art after consideration of the present disclosure, the broadband reflective and emissive context information gathered by at least some embodiments of the present disclosure includes reflected and radiated light at wavelengths longer than 1 μm. Such image data is registered by the sensor system 104 as part of the aggregation of data from individual image frames, and therefore is reliably and immediately available as part of the aggregate image. The context image can appear as a high contrast gray scale image. As sources of thermal energy appear in the context image as bright spots, the exact location of many sources 128 of GHGs can be directly identified by their heat signature, as well as by structural features that may appear in the image. GHG emissions 120 appear as cloudy areas overlaid on the context image. A depiction of an aggregate image output by a sensor system 104 as disclosed herein is illustrated in FIG. 9. The image of FIG. 9 is annotated for illustration purposes with labels identifying GHG emissions 120, a source 128 of the GHG emissions 120, and Earth 132. In some embodiments, the aggregate image may be displayed on a graphical user interface (GUI) by the sensor system 104 processor 208 or by another device.

Embodiments of the present disclosure can further process collected image data, for example to provide information on the identity of detected gasses, emission rates, and concentrations. In addition to implementing digital TDI process, such additional processing can include application of deep learning methods and processes in connection with the sensing of one or more gases of interest and further with the identification of the source of the detected emissions. Such further processing can be performed by the processor 208 in cooperation with the memory 212, and/or by ground based or other processing centers, and can include the use of neural networks applying artificial intelligence techniques. Any type of neural network or machine learning process can be applied in connection with embodiments of the present disclosure. These can include deep neural networks, convolutional deep neural networks, deep Q networks, and recurrent neural networks. In addition to the included context information, location information, such as from a global positioning system (GPS), inertial navigation unit (INU), or other location determination or navigation system that is also included as part of the sensor system 104 or the platform 108 can be used to provide numeric geolocation information regarding detected emissions 120 and their sources 128. In accordance with the least some embodiments of the present disclosure, information regarding a detected plume of emissions 120, and the density of such emissions, can be output separately from or in addition to an aggregated image. Processing can additionally include determining concentration information regarding detected plumes of emissions 120.

Sensor systems 104 in accordance with embodiments of the present disclosure can replace the prior space-based, spectrometer architecture approach with a unique MSI architecture. Rather than having each of the pixels of the sensor array 236 measure a small spectral band (to resolve the target molecule's electronic, rotational, and stretch modes) at a given line-of-sight as in the spectrometer-based architecture, the MSI-based architecture sensor systems 104 disclosed herein apply a set of spectral filters 404 that envelopes on and off the molecule's absorptive (reflective) or emissive (infrared) bands above a given set of rows of pixels on the sensor array 236 to measure radiation at the line-of-sight (LOS) of each pixel. As the MSI payload is scanned across the scene, the same LOS is coadded within each row of pixels. This architecture eliminates the spectrometer and directly couples the collecting telescope 220 to the sensor array 236 and the attached filter array 232 (which includes the spectral filters 404). As compared to spectrometer-based architectures, embodiments of the present disclosure provide a simpler architecture. In addition, embodiments of the present disclosure provide light within wider spectral bands to each pixel than spectrometer-based architectures, which provides improved signal-to-noise, enables smaller ground sampling per pixel, enables smaller telescope apertures, and/or removes the need for unique maneuvers/systems (e.g. satellite back scan and/or payload scanning mirrors). In addition, the efficient design lowers cooling requirements, making collection of GHG emissive (infrared) bands more feasible.

The MSI-based architecture measures the column of atmosphere each LOS collects through enveloping spectral filters 404 both on and off the absorptive or emissive molecular modes. The data is processed to remove the impact of ground spectra, sun angle, and/or thermal characteristics by using a priori knowledge of sun angle, ground characteristics, and atmospheric conditions, and a comparison of on and off molecular spectral bands. Discrimination of the source quantity from the atmosphere is typically done by either mathematically comparing neighbor (non-emitter) pixel signatures or fitting the GHG spectral bands (on and off molecular spectral bands) of the pixels.

The MSI-based architecture eliminates the complicated spectrometer of conventional systems and provides improved pixel signal-to-noise. This simpler architecture with higher radiometric performance lowers space-based system cost with smaller apertures, removes the complicated spectrometer, and removes complicated collection methods and devices of alternative approaches. In addition, the compact design lowers thermal load enabling efficient cryocooler designs for MWIR with the nominal SWIR collection that can operate in both day (SWIR sunlit conditions) and night (MWIR emissive conditions). With the colder operation, the MSI-based architecture can sample stronger absorptive and emissive bands to improve sensitivity.

Embodiments of the present disclosure provide a novel system and method for space-based, remote day and night sensing (detection, identification, and quantification) of Greenhouse Gas (nominally Carbon Dioxide and Methane) emission sources 128 (e.g. power turbines, natural gas compression units, natural gas pipelines, crude oil and chemical refineries, etc.) at a high enough resolution (nominally less than 30 m), to attribute the GHG to a specific asset. The described systems and methods apply MSI using select spectral bands on and off the selected absorptive or emissive bands of selected gases and then processing that mathematically compares spectral bands and historical collections to identify and quantify ground, GHG emission sources. The space-based approach chooses spectral filters in the molecular absorptive (reflective) and emissive (infrared) bands that are disposed over a sensor array 236 to provide multiple, coadded samples of the scene that includes an emission source 128. This novel MSI approach can provide a sensor system 104 that is low cost, operates in day and night, and enables large area collection of GHG emission sources 128 from a space-based platform. The system and method can include:

(a) A spectrometer-free architecture (typical approach for gas detection, identification, and quantification), using MSI with optical, narrowband spectral filters 404 having bandpass both on and off the molecule's absorptive (reflective) and emissive (infrared) bands;

(b) A processing method that mathematically compares spectral bands and historical collections, scaled in-scene reference band, or predictive radiance using atmospheric models scaled with in-scene (off band) spectral bands to identify and quantify ground, GHG emission sources 128. Processing can apply both space and ground collected measurements of ground, atmosphere, environment, and solar conditions. Processing methodology may apply artificial intelligence, learning, and data analytics approaches to improve detection, identification, and quantification of GHGs and their sources 128;

(c) A scanning space-based system using a wide field of view (greater than 3 degrees) telescope 220 with a digital, TDI focal plane (sensor array 236) having spectral filters 404 disposed in a filter array 232 that is directly attached above the active area (pixels) of the sensor array 236;

(d) A TDI approach to improve area collection rate and signal-to-noise that either uses:
   i. a scanning focal plane (sensor array 236) designed with groups of rows of pixels having a common spectral filter 404 that are directly coadded in sequence at a rate proportional to the ground speed to build the image row-by-row or,
   ii. a framing focal plane (sensor array 236) designed to image the entire scene with multiple filters 404 over designated rows that frame at a rate proportional to the ground speed and are post processed to align the same ground sampled area from each frame to build the image;

(e) A single camera 204 with either a single focal plane or multiple focal planes having pixels that are sensitive to the molecular absorptive band in the SWIR and emissive band in the Mid-Wave Infrared MWIR;

(f) Reconfigurable focal plane electronics 240 capable of running and collecting data from each focal plane (sensor array 236) and then applying on-board processing to collect, compress and potentially process images of ground scenes containing emission sources 128 to either transmit data with raw images and/or detection messages containing emitter location, emission molecule, quantification, and validity of measurement;

(g) A thermal management system using space radiators and cryogenic cooling to lower the temperature of optics and sensor arrays 236. The cryogenic cooling may use unique techniques for selection and application of commercial cryocoolers for space and/or mitigation/reduction of exported forces and torques that lead to payload vibration that blurs the collected data; and/or (h) Capabilities to work in both day and night conditions are enabled and enhanced with a very sensitive MWIR detector which can be cooled with a novel cryocooler to reduce dark currents and an innovative design associated with the cooler that dissipates the exported force and torque that would normally cause vibrations that produces excessive noise in the spectra being measured.

In accordance with further embodiments of the present disclosure, emission 120 rates for a detected source 128 can be determined by the sensor system 104. Moreover, topographical data can be correlated and used in combination with the detection information to provide accurate location information regarding emissions and determinations of emission rates. In addition, information regarding objects within a scene 112 can be utilized in assigning or determining a confidence value regarding a detected source 128, or a rate of a detected source 128. Moreover, emission 120 rates can be estimated using a sensor system 104 as described herein without requiring information regarding meteorological conditions, such as wind speeds at the site of the emission 120. Embodiments of the present disclosure can be implemented through a system operating autonomously, and thus without requiring manual estimations made from visual observations. Moreover, emissions 120 rates can be determined using active and passive measurement systems, and furthermore can be determined in real-time or near real-time.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A sensor system, comprising:
   a telescope assembly;
   a filter array, wherein the filter array includes a plurality of spectral filters, wherein a first spectral filter in the plurality of spectral filters has a passband that encompasses an absorption band of a first gas, wherein a second spectral filter in the plurality of spectral filters has a passband that encompasses an emission band of the first gas, wherein a third spectral filter in the plurality of spectral filters has a passband that encompasses an absorption band of a second gas, and wherein a fourth spectral filter in the plurality of spectral filters encompasses an emission band of the second gas; and
   a sensor array, wherein the sensor array includes a plurality of pixels arranged in rows and columns, wherein the filter array is disposed on a light incident surface side of the sensor array, and wherein each spectral filter overlays a different set of pixel rows.

2. The sensor system of claim 1, wherein the first and second spectral filters are disposed between the third and fourth spectral filters.

3. The sensor system of claim 1, wherein the filter array includes first and second filter arrays, wherein the sensor array in includes first and second sensor arrays, wherein the first and third spectral filters are included in the first filter array and are each disposed over a light incident surface side of the first sensor array, and wherein the second and fourth spectral filters are included in the second filter array and are each disposed over a light incident surface side of the second sensor array.

4. The sensor system of claim 3, wherein the first sensor array operates to detect light at shortwave infrared wavelengths, and wherein the second sensor array operates to detect light at mid-wave infrared wavelengths.

5. The sensor system of claim 1, further comprising:
   a cryocooler, wherein the cryocooler is thermally connected to the sensor array.

6. The sensor system of claim 1, further comprising a processor, wherein the processor is configured to generate an image based on output of the sensor array.

7. The sensor system of claim 6, wherein the image is displayed using a graphical user interface.

8. The sensor system of claim 1, wherein the first gas is carbon dioxide, and wherein the second gas is methane.

9. The sensor system of claim 1, wherein a fifth spectral filter in the plurality of spectral filters has a passband that encompasses an absorption band of a third gas, and wherein a sixth spectral filter in the plurality of spectral filters has a passband that encompasses an emission band of the third gas.

10. The sensor system of claim 9, wherein first gas is carbon dioxide, wherein the second gas is methane, and wherein the third gas is water vapor.

11. The sensor system of claim 1, wherein each spectral filter in the plurality of spectral filters has a different passband than any other spectral filter in the plurality of spectral filters.

12. A method for sensing emissions, comprising:
collecting light from within a selected field of view;
disposing a plurality of spectral filters over a sensor array, wherein each spectral filter in the plurality of spectral filters is disposed over a different set of pixel rows included in the sensor array;
generating a plurality of frames of image data, wherein each frame of image data is generated from light collected during a different exposure period than any other frame of image data, wherein each frame of image data corresponds to a field of view that is shifted by a selected row amount relative to an adjacent frame of image data, and wherein generating each frame of image data in the plurality of frames of image data includes:
passing a first portion of the collected light through a first spectral filter included in the plurality of spectral filters, wherein the first spectral filter has a passband that encompasses an absorption band of a first gas;
passing a second portion of the collected light through a second spectral filter included in the plurality of spectral filters, wherein the second spectral filter has a passband that encompasses an emission band of the first gas;
passing a third portion of the collected light through a third spectral filter included in the plurality of spectral filters, wherein the third spectral filter has a passband that encompasses an absorption band of a second gas;
passing a fourth portion of the collected light through a fourth spectral filter included in the plurality of spectral filters, wherein the fourth spectral filter has a passband that encompasses an emission band of the second gas; and
aggregating a plurality of the frames of image data to generate an aggregate image, wherein areas of the aggregate image include information collected by pixels associated with different spectral filters.

13. The method of claim 12, wherein the aggregate image includes context information collected by the sensor array.

14. The method of claim 13, wherein image data collected from the first, second, third, and fourth passbands indicates a presence of the first gas and is presented as an obscuration of the context information.

15. The method of claim 12, further comprising:
collecting light in daytime conditions to sense a presence of the first and second gasses.

16. The method of claim 15, further comprising:
collecting light in nighttime conditions to sense a presence of the first and second gasses.

17. The method of claim 15, wherein the aggregate image is formed from pixel data collected in different image data frames and added to one another based on a ground position using digital time domain integration (TDI) techniques.

18. The method of claim 15, further comprising displayed the aggregate image using a graphical user interface.

19. A computing system, the computing system comprising:
a processor; and
memory storing machine-readable instructions that upon execution cause the processor to:
use an output of a sensor system to generate a series of frames of image data, wherein each frame corresponds to a field of view that is shifted by a selected pixel row amount relative to an adjacent frame; and
aggregate a plurality of the frames of image data in the series to generate an aggregate image, wherein the sensor system includes:
a telescope assembly that collects light from within a selected field of view;
a filter array, wherein the filter array includes a plurality of spectral filters, wherein a first spectral filter in the plurality of spectral filters has a passband that encompasses an absorption band of a first gas, wherein a second spectral filter in the plurality of spectral filters has a passband that encompasses an emission band of the first gas, wherein a third spectral filter in the plurality of spectral filters has a passband that encompasses an absorption band of a second gas, and wherein a fourth spectral filter in the plurality of spectral filters encompasses an emission band of the second gas; and
a sensor array, wherein the sensor array includes a plurality of pixels arranged in rows and columns, wherein the filter array is disposed on a light incident surface side of the sensor array, and wherein each spectral filter overlays a different set of pixel rows.

20. The computing system of claim 19, wherein the aggregate image is formed from pixel data collected in different image data frames and added to one another based on a ground position using digital time domain integration (TDI) techniques.

* * * * *

UNITED STATES PATENT AND TRADEMARK OFFICE
CERTIFICATE OF CORRECTION

Page 1 of 1

PATENT NO. : 12,313,534 B2
APPLICATION NO. : 18/121152
DATED : May 27, 2025
INVENTOR(S) : Gary D. Wiemokly and Timothy J. Commons It is certified that error appears in the above-identified patent and that said Letters Patent is hereby corrected as shown below:

In the Claims

Column 16, Line 12, Claim 18, change "displayed" to "displaying".

Signed and Sealed this
Twelfth Day of August, 2025

Coke Morgan Stewart
*Acting Director of the United States Patent and Trademark Office*